Figure 1:
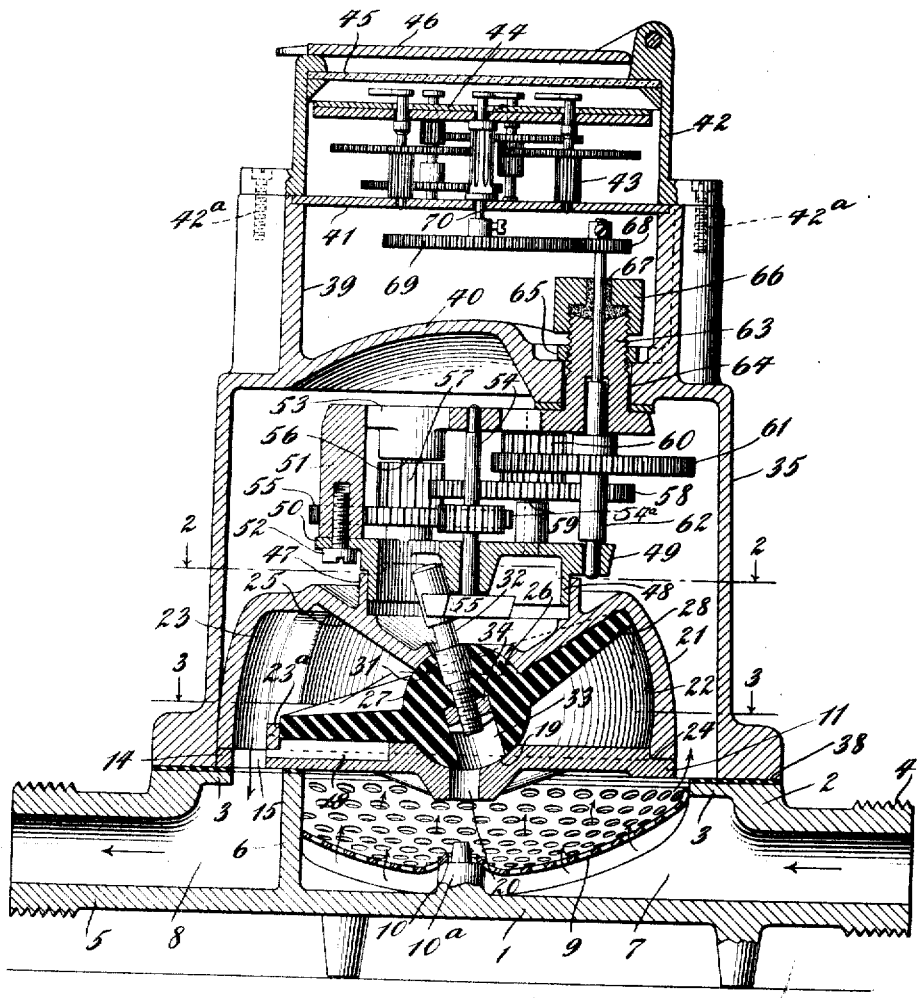

L. H. NASH.
WATER METER.
APPLICATION FILED SEPT. 3, 1912.

1,103,612.

Patented July 14, 1914.
3 SHEETS—SHEET 1.

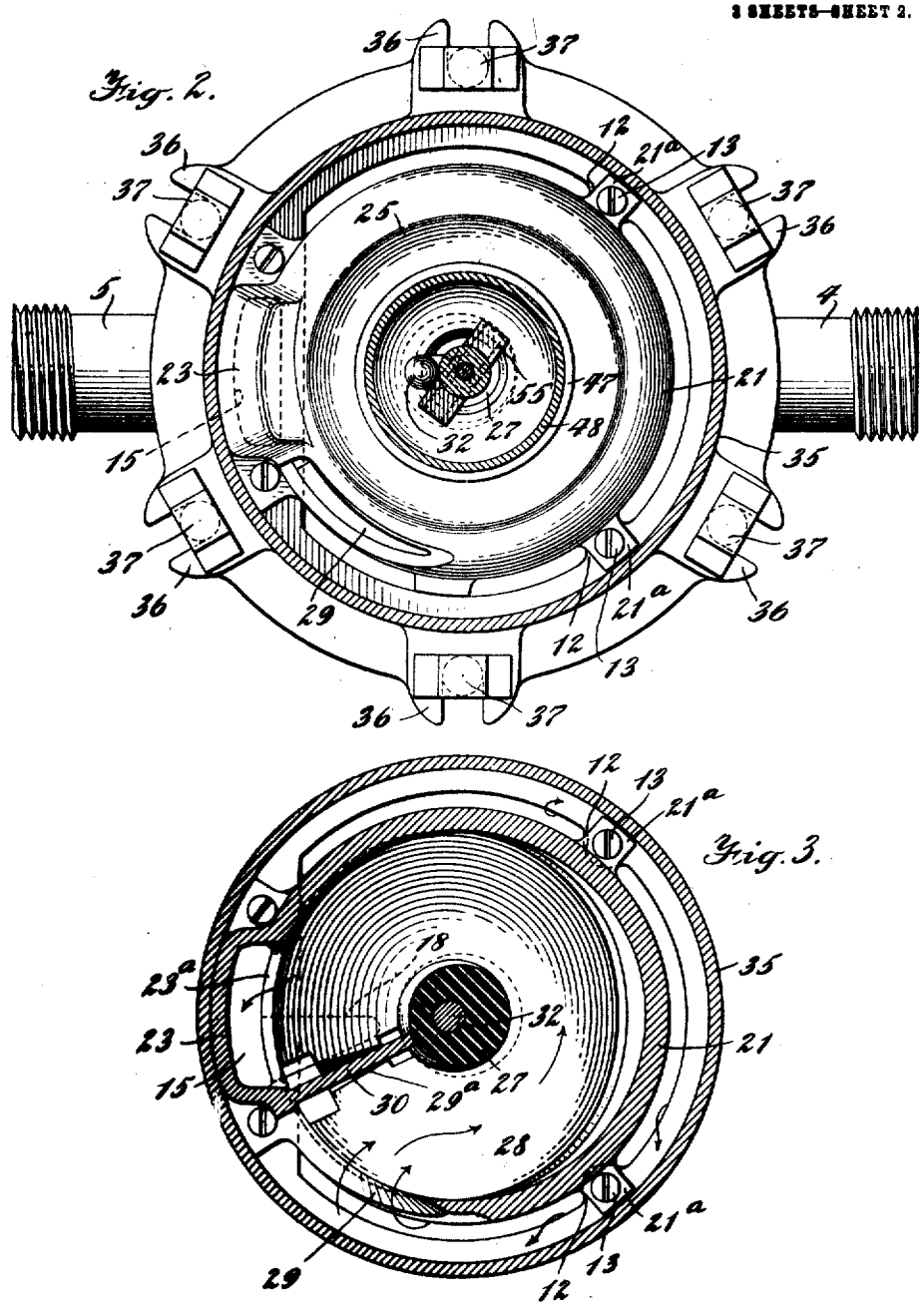

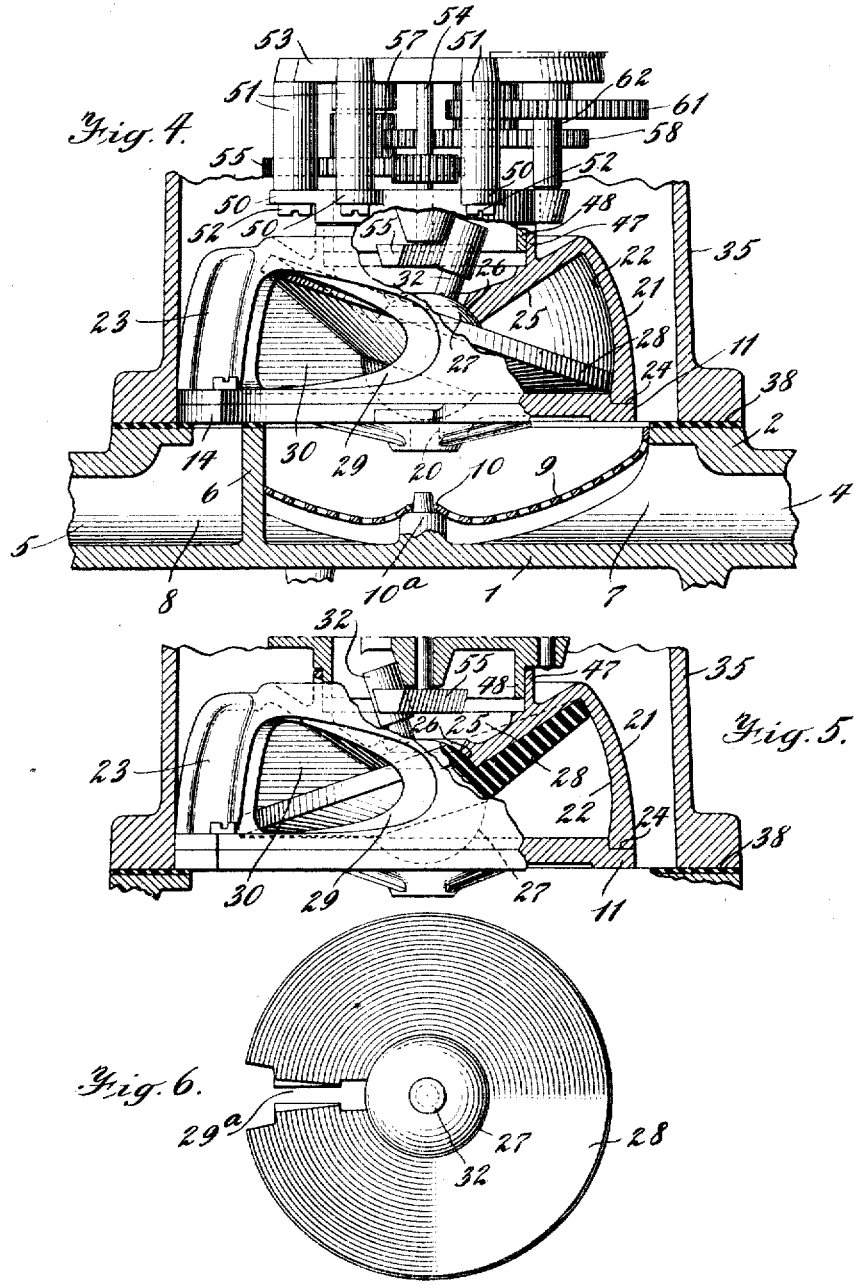

UNITED STATES PATENT OFFICE.

LEWIS HALLOCK NASH, OF SOUTH NORWALK, CONNECTICUT.

WATER-METER.

1,103,612.  Specification of Letters Patent.  Patented July 14, 1914.

Application filed September 3, 1912.  Serial No. 718,204.

*To all whom it may concern:*

Be it known that I, LEWIS HALLOCK NASH, a citizen of the United States, residing at South Norwalk, in the county of Fairfield and State of Connecticut, have invented certain new and useful Improvements in Water-Meters, of which the following is a specification.

My invention relates to new and useful improvements in water meters, and the invention consists in the construction and arrangement of parts, and their aggroupment in operative combination to be more fully described hereinafter and the novelty of which will be particularly pointed out and distinctly claimed.

I have fully and clearly illustrated my invention in the accompanying drawings to be taken as a part of this specification and wherein:

Figure 1 is a vertical central section through a structure embodying my present invention. Fig. 2 is a horizontal section on the line 2—2 of Fig. 1. Fig. 3 is a horizontal section on the line 3—3 of Fig. 1. Fig. 4 is a vertical central section through a meter embodying my invention, part of the piston casing being in elevation and part broken away. Fig. 5 is a view similar to that of Fig. 4 but showing the piston in another position. Fig. 6 is a plan view of a piston employed in the shown embodiment of the invention.

Referring to the drawings by characters of reference, 1 designates the base portion of a meter casing structure upon which the parts of the measuring mechanism, its driving means and the casing therefor are mounted, said base being circular in plan, as shown in Fig. 2, and having a vertical circumferential wall 2, formed with a horizontal inwardly projecting annular flange 3. This base is provided with an inlet nipple 4 and an outlet nipple 5, adapted to be connected to the pipe line through which passes the flow to be measured, and in said base is a vertical partition 6 separating the inlet from the outlet. This partition forms a chord with the circular wall of the casing base, so that the inlet side of the base is in the form of a segment of a circle, and said partition divides said base into inlet and outlet chambers 7, 8.

Arranged in the base 1, above the bottom thereof, is a screen 9 of sheet metal having elasticity, said screen being concave or saucer-shaped, as shown, and having a central opening 10, to receive a centering stud 10ª cast integral with the bottom wall of the base. The screen 9 is of a diameter slightly greater than the inlet portion of the casing and conforms in contour thereto, so that when it is forced down into place, it will frictionally and yieldingly engage the interior wall of the inlet side of the casing which frictional engagement will serve to snugly hold the screen in place.

11 designates a base plate for the piston casing said plate being arranged concentric with the base 1, and supported on the flange 3, by means of ears 12 integral with the plate 10 said ears being secured to said flange by screws 13. This plate 11, throughout that portion of its area over the inlet side of the base 1, is spaced inward from said flange 3 so as to leave a space for the upward flow of water from the inlet. The plate is provided with an extension or lobe 14, extending over the outlet chamber 8, which extension is provided with a port 15, communicating with the outer chamber. In its upper face the plate has a radial relief duct 18, opening at its outer end into the port 15. The plate 11 is also formed with a central concave bearing seat 19, for the ball of a wabbling piston to be presently described, said seat having an opening 20, communicating with the inlet portion of the base 1. The piston casing is completed by a circular dome 21, having an inner curved side wall 22, which at one side is provided with a chambered extension 23, extending over the extension 14, of the plate 11, and opening through the port 15, to provide communication between the outlet and the interior of the piston casing. The lower edge of the circular wall 22 of the dome is seated in a circumferential rabbet 24 in the upper face of the plate 11, as is also a bridge piece 23ª, forming a continuation of the main wall of chamber 21, extending across the bottom of the extension 23 and seated in the said rabbet 24 and projecting above the upper face of the plate 10. It will be seen that the arrangement is such that a tight joint is formed between the plate 11 and the dome 21 at all points except the vent or duct 18 and the communication between the chamber 23 and the port 15. The dome 21 is formed with a conical depression in its upper portion forming the interior of the piston casing with a conical wall 25. The plate 10 and dome 21 form a substantially circular chamber having a flat bottom and conical top flaring upward and outward from the center. The wall 25 has at its central portion a circular seat 26, concentric with the seat 19 said seats together forming a spherical seat for the central bearing ball 27 of a wabbling plate piston 28, the web of which flares to conform to the flare of the dome wall, the piston, during its movements conforming to, and riding on the surface of the plate 11 with its underside, and of the dome wall with its upper side.

The piston casing is provided with an inlet 29 through the dome wall and separating this inlet from the outlet 23, is a radial partition 30 joining the upper and lower walls of the chamber and engaging the ball 27 at its inner end. The web of the piston is provided with a radial slot 29ª to receive the partition 30. The dome 21 is held in place by ears 21ª overlying the ears 12 and secured by the screws 13.

The bearing ball 27 of the piston 28 is provided with a diametrically extending opening 31 in which is rigidly seated an upwardly extending rod 32, adapted to coöperate with the transmission mechanism for transmitting motion from the piston to the measuring mechanism. This inner end of this rod 32 is threaded and projects into a recess 33 on the inner side of the ball 27, where it is secured by a nut 34 threaded on the said inner end.

It will be understood that the opening 20 provides for the admission of water beneath the bearing ball to balance the downward pressure on the piston.

Mounted on the base 1 is the body of the meter casing consisting of a substantially cylindrical main portion 35 having at its base, split ears 36, to receive fastening bolts 37, by means of which it is secured to corresponding ears on the base 1. Between the base 1 and the body 35 is a layer of packing material 38 to prevent leakage between the parts. The body 35 carries at its upper portion a cylindrical chamber 39 separated from the body by a partition 40 and closed at its upper end by a partition 41, over which is secured a casing 42 for the driving train 43 for the pointers of the dial indicator 44. The casing 42 is closed and sealed by a glass plate 45, and the usual hinged cover plate 46 is provided. The chamber 42 is secured in place by screws 42ª, engaging ears on the sides of the chamber 39.

The upper end of the dome 21 is provided with an annular vertical flange 47 forming a seat which receives an annular flange 48, on the bottom of a supporting plate 49 for the transmission gearing between the piston and meter mechanism. This plate 49 is provided with ears 50 upon which are seated the lower ends of posts 51, secured by screws 52, supporting at their upper ends the plate 53 parallel with the plate 49.

Journaled in bearings in the plates 49, 53, is a shaft 54 having at its lower end a cross bar 55 engaged and rotated by the rod 32 on the piston, whereby the shaft 54 is rotated. The shaft 54 carries a gear 54ª meshing with a gear 55 on a shaft 56 journaled in the plates 49, 53, and carrying a pinion 57 which meshes with a gear 58 on a shaft 59 carrying a pinion 60 meshing with a gear 61 on a shaft 62. The shaft 62 at its upper end extends through an elongated bearing 63 on the upper side of the plate 53 which elongated bearing extends through an opening 64 in the partition 40 into the chamber 39. The bearing 63 is threaded at its upper end to receive a clamping nut 65 by means of which the gearing and frame are securely clamped to the casing. The bearing 63 also carries a packing nut 66 surrounding the shaft and inclosing suitable packing material 67. At its upper end, the shaft 62 carries a gear 68 meshing with a gear 69 on the lower end of the driving shaft 70 of the indicator mechanism.

By the arrangement of the plates 49, 53, and the manner of securing the same in place by the flanges 47, 48, a convenient means is provided whereby the gearing is properly centered relative to the driving rod of the piston 28. It will also be seen that the gearing is not effected by expansion and contraction of the parts as there is a slip connection between the piston casing and the plate 49, the gearing being rigidly supported from the partition 40. This is important because proper mesh is always provided between the gears 68, 69, without regard to the expansion and contraction of the piston casing or the meter casing.

The manner of securing the screen 9 in place has advantages in that the strong frictional engagement prevents accidental dislodgment and rattling of the screen, and provides a convenient means for securing the screen in place without the use of additional fastening devices or means.

It is thought that the operation of the invention will be clear to those skilled in the art from the above description, but briefly it may be stated as follows: The water enters the inlet 4 and flowing upward through the screen, as indicated by the arrows, passes around the outer edge of the plate 11 and fills the space of the chamber 35 flowing over and around the dome 21. The water enters the inlet 29 and acting alternately on the top and bottom of the piston 28, wabbles the same causing the rod 31 to rotate and thereby impart rotation to the bar 55 and shaft 54. Through the train of gearing described motion is transmitted from the shaft 54, to the shaft 62 which serves to drive the pinion 68, the gear 69 of the indicator mechanism.

What I claim and desire to secure by Letters Patent of the United States is:—

1. In a water meter, in combination, a base having an inlet, an outlet, and an annular internal flange, a piston chamber comprising a base plate spaced from said base and having ears overlying said flange, a dome supported on said plate and having ears overlying the ears on said plate, fastening devices connecting said ears to said flange, a piston in said chamber, a casing secured to said base and inclosing said chamber, and having a compartment separated from the piston chamber by a partition, indicator mechanism in said compartment, and gearing below said partition connecting the piston with the indicator mechanism.

2. In a water meter, in combination, a base having an inlet, an outlet and an annular internal flange, a piston chamber comprising a flat base plate, having an opening communicating with said outlet, and having a circumferential rabbet, said plate being circumferentially spaced from said flange and having ears overlying said flange, a dome supported on said plate and the lower edge of which engages said rabbet, said dome having an opening communicating with said inlet and ears overlying said first-named ears, fastening devices connecting said ears to said flange, a piston in said chamber, indicator mechanism driven by said piston, and a casing supported on said base and inclosing said chamber and mechanism.

3. In a water meter, in combination, a base having an inlet and an outlet, a partition separating said inlet and outlet, an internal annular flange on the base, a piston chamber comprising a flat base plate having an opening communicating with said outlet and resting on said partition, said plate being spaced from said flange and having ears overlying said flange, a dome supported on said plate and completing said chamber, and having an opening communicating with the said opening in the plate, and a second opening communicating with the said inlet, said dome having ears overlying said first-named ears, fastening devices connecting said ears to said flange, a piston in said chamber, indicator mechanism, and a casing supported on said base and inclosing said chamber and mechanism.

In testimony whereof I have hereunto signed my name in the presence of two subscribing witnesses.

LEWIS HALLOCK NASH.

Witnesses:
ELMER J. AUSTIN,
CHARLES KELLY.

It is hereby certified that in Letters Patent No. 1,103,612, granted July 14, 1914, upon the application of Lewis Hallock Nash, of South Norwalk, Connecticut, for an improvement in "Water-Meters," an error appears in the printed specification requiring correction as follows: Page 1, line 81, for the word "outer" read *outlet;* and that the said Letters Patent should be read with this correction therein that the same may conform to the record of the case in the Patent Office.

Signed and sealed this 11th day of August, A. D., 1914.

[SEAL.]
J. T. NEWTON,
*Acting Commissioner of Patents.*